United States Patent [19]
Takeuchi

[11] Patent Number: 5,620,238
[45] Date of Patent: Apr. 15, 1997

[54] BRAKE CONTROL DEVICE FOR AUTOMOTIVE VEHICLE

[75] Inventor: Hiroaki Takeuchi, Toyota, Japan

[73] Assignee: Aisin Seiki Kabushiki Kaisha, Kariya, Japan

[21] Appl. No.: 556,142

[22] Filed: Nov. 9, 1995

[30] Foreign Application Priority Data

Nov. 11, 1994 [JP] Japan .................................. 6-277717

[51] Int. Cl.$^6$ ........................................................ B60T 8/32
[52] U.S. Cl. .................................... 303/113.2; 303/116.1; 303/189; 303/900
[58] Field of Search .............................. 303/189, 119.1, 303/113.2, 119.2, 900, 901, 125, 116.1, 116.2, 116.3, 116.4, 10–12, 113.3, 113.1, 139, 140, 190, 186, 113.5

[56] References Cited

U.S. PATENT DOCUMENTS

| | | |
|---|---|---|
| 4,934,761 | 6/1990 | Sauvageot et al. |
| 4,969,696 | 11/1990 | Yogo et al. .............................. 303/189 |
| 5,441,336 | 8/1995 | Takeuchi .................................. 303/900 |
| 5,531,514 | 7/1996 | Nishii et al. .......................... 303/116.1 |

*Primary Examiner*—Douglas C. Butler
*Attorney, Agent, or Firm*—Burns, Doane, Swecker & Mathis, LLP

[57] ABSTRACT

A brake control device includes a master cylinder for generating a brake fluid pressure that is supplied to a first wheel brake via a switching valve and a first normally opened solenoid valve. The brake fluid pressure is also supplied to a second wheel brake via the switching valve and a second normally opened solenoid valve. The first wheel brake and the second wheel brake are associated with a one-way fluid pressure pump. Each of the switching valve, the solenoid valves and the pump is independently controllable. By selecting the condition of each of the switching valve, the solenoid valves and the pump, the brake fluid pressure supplied to each of the wheel brakes is adjustable depending on function which the brake control device is to fulfill.

13 Claims, 2 Drawing Sheets

BRAKE CONTROL DEVICE FOR AUTOMOTIVE VEHICLE

FIELD OF THE INVENTION

The present invention relates to a brake control device, and more particularly to a brake control device for an automotive vehicle in which, regardless of establishment of a vehicle braking operation, an independent fluid pressure control of each wheel brake can be realized.

BACKGROUND OF THE INVENTION

In a conventional brake control device for an automotive vehicle such as that disclosed in, for example, U.S. Pat. No. 4,934,761, a reversible fluid pressure pump is provided for each wheel brake for regulating the fluid pressure supplied thereto when anti-skid control, traction control or other brake control operations are established.

However, the provision of a reversible fluid pressure pump for each wheel brake necessarily increases the overall size of the brake control device and undesirably increases the manufacturing cost.

SUMMARY OF THE INVENTION

A need exists, therefore, for a brake control device for an automotive vehicle that does not suffer from the aforementioned drawbacks, but which is nevertheless able to provide the desired braking operation.

A need also exists for a brake control device for an automotive vehicle which is relatively small in size.

It would also be desirable to provide an automotive vehicle brake control device which can be manufactured at a relatively low cost.

To address the foregoing needs, a brake control device for an automotive vehicle in accordance with the present invention includes a master cylinder in which is defined a fluid pressure chamber, a first wheel brake for braking a driving wheel, a second wheel brake for braking another driving wheel or a driven wheel, and a fluid passage for supplying fluid pressure from the fluid pressure chamber to the first wheel brake and the second wheel brake. The brake control device also includes a one-way fluid pressure pump having a sucking side and a discharging side, an electric motor for driving the one-way fluid pressure pump, and a switching valve disposed in the fluid passage which is movable between a first position and a second position. In the first position, the switching valve establishes fluid communication between the fluid pressure chamber and each of the first wheel brake and the second wheel brake, and also interrupts fluid communication between the sucking side of the one-way fluid pressure pump and the fluid pressure chamber. In the second position, the switching valve establishes fluid communication between the sucking side of the one-way fluid pressure pump and the fluid pressure chamber, and also interrupts fluid communication between the fluid pressure chamber and each of the first wheel brake and the second wheel brake. A first normally opened solenoid valve is disposed between the switching valve and the first wheel brake, and a second normally opened solenoid valve is disposed between the switching valve and the second wheel brake. A return circuit establishes fluid communication between the sucking side of the one-way fluid pressure pump and each of the first wheel brake and the second wheel brake, and also establishes fluid communication between the discharging side of the one-way fluid pressure pump and a portion of the fluid passage which is located between the first switching valve and both the first normally opened solenoid valve and the second normally opened solenoid valve. A relief valve opens when fluid pressure discharged from the discharging side of the one-way fluid pressure pump exceeds a predetermined value in order to relieve the surplus fluid pressure to the fluid passage at a point located between the switching valve and the fluid pressure chamber. A first regulating device is disposed in the portion of the return circuit which is located between the sucking side of the first one-way fluid pressure pump and the first wheel brake. The first regulating device decreases and increases the fluid pressure in the first wheel brake in response to the opening and closing of the first solenoid valve while the fluid pressure is increased in the portion of the fluid passage which is located between the switching valve and both the first normally opened solenoid valve and the second normally opened solenoid valve. A second regulating device is disposed in the portion of the return circuit which is located between the sucking side of the first one-way fluid pressure pump and the second wheel brake. The second regulating device decreases and increases the fluid pressure in the second wheel brake in response to the opening and closing of the second solenoid valve while the fluid pressure is increased in the portion of the fluid passage which is located between the switching valve and both the first normally opened solenoid valve and second normally opened solenoid valve.

BRIEF DESCRIPTION OF THE DRAWING FIGURES

The above and other features and advantages of the present invention will become more apparent and more readily appreciated from the following detailed description of preferred exemplary embodiments of the present invention, considered in connection with the accompanying drawing figures in which like elements are designated by like reference numerals and wherein:

FIG. 1 is a circuit diagram of a first embodiment of a hydraulic braking system for an automotive vehicle in accordance with the present invention; and FIG. 2 is a circuit diagram of a second embodiment of a hydraulic braking system for an automotive vehicle in accordance with the present invention.

DESCRIPTION OF THE PREFERRED EMBODIMENTS

Figure 1:
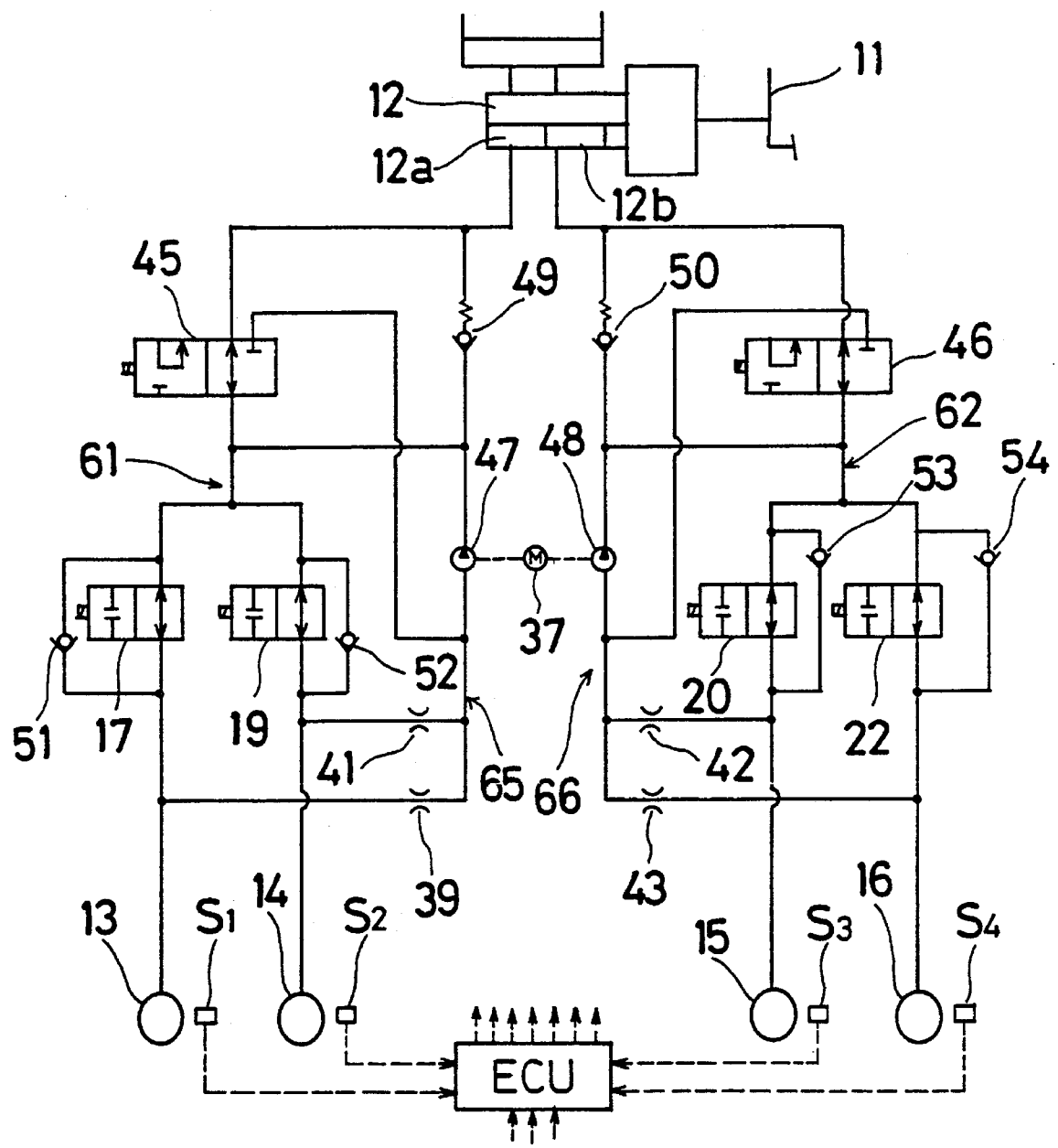

Referring first to a FIG. 1 which shows a circuit diagram of a first embodiment of a brake control device 10 for an automotive vehicle in accordance with the present invention, the brake control device 10 includes a tandem type master cylinder 12 in which is defined a first fluid pressure chamber 12a and a second fluid pressure chamber 12b. The master cylinder 12 is connected to a brake pedal 11 so that fluid pressure is generated in each of the first pressure chamber 12a and the second fluid pressure chamber 12b when the brake pedal 11 is depressed as is well known.

The first pressure chamber 12a is in fluid communication with a wheel brake 13 via an electromagnetically operated switching valve or change-over valve 45 and a normally opened solenoid valve 17. The first pressure chamber 12a is also in fluid communication with another wheel brake 14 via the electromagnetically operated switching valve 45 and a normally opened solenoid valve 19. The fluid pressure generated in the first fluid pressure chamber 12a is supplied to both of the wheel brakes 13 and 14 via a fluid passage 61 in which the switching valve 45 and the solenoid valves 17 and 19 are disposed.

The second pressure chamber 12b is in fluid communication with a wheel brake 15 via an electromagnetically operated switching valve 46 and a normally opened solenoid valve 20. The second pressure chamber 12b is also in fluid communication with another wheel brake 16 via the electromagnetically operated switching valve 46 and a normally opened solenoid valve 22. The fluid pressure generated in the second fluid pressure chamber 12b is supplied to both of the wheel brakes 15 and 16 via a fluid passage 61 in which the switching valve 46 and the solenoid valves 20 and 22 are disposed.

The wheel brake 13 is connected, via an orifice 39, to the sucking or draw side of a one-way fluid pressure pump 47. This one-way fluid pressure pump 47 can be in the form of a general plunger type pump. The wheel brake 14 is also connected, via an orifice 41, to the sucking or draw side of the one-way fluid pressure pump 47. The wheel brake 15 is connected, via an orifice 42, to the sucking or draw side of a one-way fluid pressure pump 48 which can also be in the form of a general plunger type pump. The wheel brake 16 is connected, via an orifice 43, to the sucking or draw side of the one-way fluid pressure pump 47. The one-way fluid pressure pumps 47 and 48 are driven by an electric motor 37 whose operation is under PWM (pulse width modulation) control.

The discharging side of the one-way fluid pressure pump 47 is connected to a fluid passage which is disposed between and connects the switching valve 45 to both of the solenoid valves 17, 19. The discharging side of the one-way fluid pressure pump 47 is also connected, via a pressure relief valve 49, to a fluid passage that is disposed between the switching valve 45 and the first fluid pressure chamber 12a. The discharging side of the one-way fluid pressure pump 48 is connected to a fluid passage which is disposed between and connects the switching valve 46 to both of the solenoid valves 20, 22. The discharging side of the one-way fluid pressure pump 48 is also connected, via a pressure relief valve 50, to a fluid passage that is located between the switching valve 46 and the second pressure chamber 12b.

A return circuit 65 is constructed for establishing fluid communication between the sucking side of the one-way fluid pressure pump 47 and both the first wheel brake 13 and the second wheel brake 14. The return circuit 65 also establishes fluid communication between the discharging side of the one-way fluid pressure pump 47 and a portion of the fluid passage 61 which is located between the switching valve 45 and both the first normally opened solenoid valve 17 and the second normally opened solenoid valve 19. A return circuit 66 is constructed for establishing fluid communication between the sucking side of the one-way fluid pressure pump 48 and both the third wheel brake 15 and the fourth wheel brake 16. The return circuit 66 also establishes fluid communication between the discharging side of the one-way fluid pressure pump 48 and the portion of the fluid passage 62 located between the switching valve 46 and both the third normally opened solenoid valve 20 and the fourth normally opened solenoid valve 22.

When the switching valve 45 is in the non-operative position, fluid communication is established between the first pressure chamber 12a and each of the solenoid valves 17 and 19, while fluid communication is interrupted between the sucking side of the fluid pressure pump 47 and the first pressure chamber 12a. On the other hand, when the switching valve 45 is in the operative position, fluid communication between the first pressure chamber 12a and each of the solenoid valves 17 and 19 is interrupted while fluid communication between the sucking side of the fluid pressure pump 47 and the first pressure chamber 12a is established.

When the switching valve 46 is in the non-operative position, fluid communication between the second pressure chamber 12b and each of the solenoid valves 20 and 22 is established while fluid communication between the sucking side of the fluid pressure pump 48 and the second pressure chamber 12b is interrupted. On the other hand, when the switching valve 46 is in the operative position, fluid communication between the second pressure chamber 12b and each of the solenoid valves 20 and 22 is interrupted, and fluid communication between the sucking side of the fluid pressure pump 48 and the second pressure chamber 12b is established.

A one-way valve or check valve 51 is provided across the solenoid valve 17 to maintain the fluid pressure in the wheel brake 13 at not less than the generated fluid pressure in the first fluid pressure chamber 12a, and another one-way valve or check valve 52 is provided across the solenoid valve 19 to maintain the fluid pressure in the wheel brake 14 at not less than the generated fluid pressure in the first fluid pressure chamber 12a. Similarly, a one-way valve or check valve 53 is provided across the solenoid valve 20 to maintain the fluid pressure in the wheel brake 15 at not less than the generated fluid pressure in the second fluid pressure chamber 12b, while another one-way valve or check valve 54 is provided across the solenoid valve 22 to maintain the fluid pressure in the wheel brake 16 at not less than the generated fluid pressure in the second fluid pressure chamber 12b.

The wheel brakes 13, 14, 15 and 16 are provided with wheel speed sensors S1, S2, S3 and S4, respectively, from which signals are fed to an electric control unit ECU. The electric control unit ECU is in the form of a micro-processor or CPU and also receives other signals from other sensors (not shown). On the basis of the signals fed to the electric control unit ECU, the electric control unit ECU effects either an automatic braking mode when a suitable braking operation is not established, an ABS mode when the locking of a rear wheel is detected by using the braking torque thereof, a traction control mode when the locking of a rear wheel is detected by using the driving torque thereof, a braking force distribution control mode when the slip rate of a rear wheel reaches a set value relative to that of a front wheel, or a stability control mode when the slip rate of an inner wheel reaches a set value relative to that of a rear wheel. Such modes are established by suitable control of each of the electric motor 37, the solenoid valves 17, 19, 20 and 22, and the switching valves 45 and 46.

In operation, if the brake control device 10 is in the ABS control mode, the fluid pressure pumps 47 and 48 are driven by the electric motor 37. During actuation of the fluid pressure pump 47, the brake fluid in the wheel brakes 13 and 14 flows, via the orifices 39 and 41, respectively, into the sucking side of the fluid pressure pump 47. The brake fluid discharged from the discharging side of the fluid pressure pump 47 is supplied, via the solenoid valves 17 and 19, to the wheel brakes 13 and 14, respectively. Thus, actuation or closing of the solenoid valve 17 (19) results in a decrease in the brake fluid pressure in the wheel brake 13 (14). Due to the fact that the amount of brake fluid supplied from the solenoid valve 17 (19) to the wheel brake 13 (14) is greater than the amount of brake fluid flowing out from the wheel brake 13 (14) via the orifice 39 (41), the deactivation of the solenoid valve 17 (19) results in an increase in the brake fluid pressure in the wheel brake 13 (14).

Similarly, during actuation of the fluid pressure pump 48, the brake fluid in the wheel brakes 15 and 16 flow, via the orifices 42 and 43 respectively, into the sucking side of the fluid pressure pump 48. The brake fluid discharged from the discharging side of the fluid pressure pump 48 is supplied, via the solenoid valves 20 and 22, into the wheel brakes 15 and 16 respectively. Thus, actuation or closing of the solenoid valve 20 (22) results in a decrease in the brake fluid pressure in the wheel brake 15 (16). Since the amount of brake fluid supplied from the solenoid valve 20 (22) to the wheel brake 15 (16) is greater than the amount of the brake fluid flowing out from the wheel brake 15 (16) via the orifice 42 (44), the deactivation of the solenoid valve 20 (22) results in an increase in the brake fluid pressure in the wheel brake 15 (16). Thus, independent control of each of the solenoid valves 17, 19, 20 and 22 enables independent fluid pressure control of each of the wheel brakes 13, 14, 15 and 16 respectively.

When the brake control device 10 is in the traction control mode in which the wheel brakes 13 and 15 are selected to control the driving wheels, the fluid pressure pumps 47 and 48 are driven by the electric motor 37, and the switching valves 45 and 46 and the solenoid valves 19 and 22 are activated. Thus, the fluid pressure pump 47 (48) sucks brake fluid in the first fluid pressure chamber 12a (second fluid pressure chamber 12b) via the switching valve 45 (46) and discharges the brake fluid under pressure into the wheel brake 13 (15) to thereby increase the fluid pressure in the wheel brake 13 (14). Thereafter, if the solenoid valve 17 (20) is closed or activated, the fluid pressure in the wheel brake 13 (14) is decreased, and if the solenoid valve 17 (20) is opened or deactivated once again the fluid pressure in the wheel brake 13 (14) is increased or recovered. This means that independent control of each of the solenoid valves 17 and 20 enables independent fluid pressure control of each of the wheel brakes 13 and 15, respectively.

As described above, during a vehicle braking operation, an independent control of the fluid pressure of each of the wheel brakes 13, 14, 15 and 16 can be established by an independent control of each of the solenoid valves 17, 19, 20 and 22 subject to actuation of the fluid pumps 47 and 48 driven by the electric motor 37, resulting in the brake control device 10 being able to also perform braking force distribution control in addition to ABS control. Moreover, even while the vehicle is not operating under a braking operation, an independent control of the fluid pressure control of each of the wheel brakes 13, 14, 15 and 16 can be established by an independent control of each of the solenoid valves 17, 19, 20 and 22 subject to actuation of the fluid pumps 47 and 48 driven by the electric motor 37. The brake control device 10 can thus realize stability control and automatic braking operation. Though in the automatic braking operation a linear mode control of the fluid pressure in each wheel brakes is required, such can be complied with by employing a PWM control of the electric motor 37 under which the rotational number of the electric motor 37 is variable. Except for automatic braking operation, the rotational number of the electric motor 37 is constant.

If the electric motor 37 malfunctions while the switching valves 45 and 46 are activated, the fluid pressure in the first pressure chamber 12a is supplied to the wheel brake 13 (14) via the switching valve 45, the fluid pressure pump 47 and the solenoid valve 17 (the switching valve 45, the fluid pressure pump 47 and the solenoid valve 19), and the fluid pressure in the second pressure chamber 12b is supplied to the wheel brake 15 (16) via the switching valve 46, the fluid pressure pump 48 and the solenoid valve 20 (the switching valve 46, the fluid pressure pump 48 and the solenoid valve 22).

In the foregoing structure, the employment of the one-way fluid pressure valve brings less pulsatory flowing-out of the fluid from the pump during operation thereof and when the brake fluid pressure has to be kept at a constant value the leakage of the brake fluid can be small.

Figure 2:
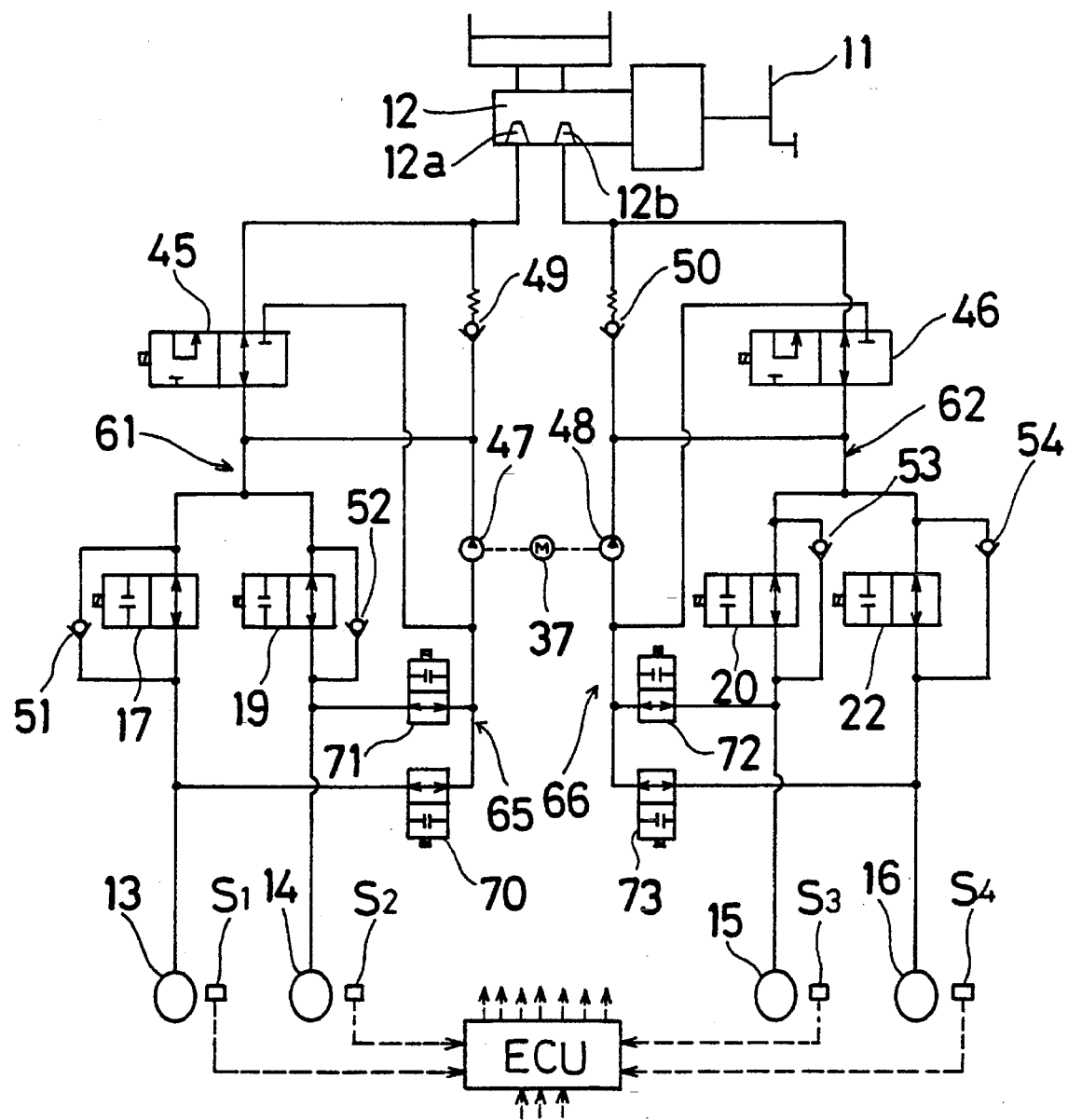

Instead of the orifices 39, 41, 42 and 43 shown in the device of FIG. 1, normally opened solenoid valves 70, 71, 72 and 73 as shown in FIG. 2 can be employed. Except for the normally opened solenoid valves 70, 71, 72 and 73, the device shown in FIG. 2 is identical to the device shown in FIG. 1 in construction and operation.

The invention has thus been shown and described with reference to several embodiments. However, it is to be understood that the invention is in no way limited to the details of the illustrated structures. Rather, changes and modifications may be made, and equivalents employed, without departing from the spirit and scope of the invention as defined in the appended claims.

What is claimed is:

1. A brake control device for an automotive vehicle comprising:

a master cylinder in which is defined a fluid pressure chamber;

a first wheel brake for braking a first driving wheel;

a second wheel brake for braking one of a second driving wheel and a driven wheel;

a fluid passage for supplying a fluid pressure from the fluid pressure chamber to the first wheel brake and the second wheel brake;

a one-way fluid pressure pump having a sucking side and a discharging side;

an electric motor connected to the one-way fluid pressure pump for driving the one-way fluid pressure pump;

a switching valve disposed in the fluid passage and movable between a first position in which fluid communication between the fluid pressure chamber and each of the first wheel brake and the second wheel brake is established and fluid communication between the sucking side of the one-way fluid pressure pump and the fluid pressure chamber is interrupted, and a second position in which fluid communication between the sucking side of the one-way fluid pressure pump and the fluid pressure chamber is established and fluid communication between the fluid pressure chamber and each of the first wheel brake and the second wheel brake is interrupted;

a first normally opened solenoid valve disposed between the switching valve and the first wheel brake;

a second normally opened solenoid valve disposed between the switching valve and the second wheel brake;

a return circuit establishing fluid communication between the sucking side of the one-way fluid pressure pump and each of the first wheel brake and the second wheel brake, the return circuit establishing fluid communication between the discharging side of the one-way fluid pressure pump and the fluid passage at a point between the first switching valve and both the first normally opened solenoid valve and the second normally opened solenoid valve;

a relief valve which is open when fluid pressure discharged from the discharging side of the one-way fluid pressure pump exceeds a predetermined value in order to relieve surplus fluid pressure to the fluid passage at a point between the switching valve and the fluid pressure chamber;

a first regulating means disposed in the return circuit at a point between the sucking side of the first one-way fluid pressure pump and the first wheel brake, the first regulating means decreasing and increasing the fluid pressure in the first wheel brake in response to closing and opening of the first solenoid valve while the fluid pressure is increased in the portion of the fluid passage located between the switching valve and both the first normally opened solenoid valve and the second normally opened solenoid valve; and a second regulating means disposed in the return circuit at a point between the sucking side of the first one-way fluid pressure pump and the second wheel brake, the second regulating means decreasing and increasing the fluid pressure in second wheel brake in response to closing and opening of the second solenoid valve while the fluid pressure is increased in the portion of the fluid passage located between the switching valve and both the first normally opened solenoid valve and second normally opened solenoid valve.

2. A brake control device as set forth in claim 1, wherein the first regulating means is an orifice.

3. A brake control device as set forth in claim 1, wherein the first regulating means is a normally opened solenoid valve.

4. A brake control device as set forth in claim 1, wherein the second regulating means is an orifice.

5. A brake control device as set forth in claim 1, wherein the second regulating means is a normally opened solenoid valve.

6. A brake control device as set forth in claim 1, wherein the electric motor is under PWM control.

7. A brake control device for an automotive vehicle comprising:

a master cylinder in which is defined a fluid pressure chamber;

a first wheel brake for braking a first driving wheel;

a second wheel brake for braking one of a second driving wheel and a driven wheel;

a fluid passage for supplying a fluid pressure from the fluid pressure chamber to the first wheel brake and the second wheel brake;

a one-way fluid pressure pump having a sucking side and a discharging side;

an electric motor connected to the one-way fluid pressure pump for driving the one-way fluid pressure pump;

a switching valve disposed in the fluid passage and movable between a first position during ABS braking control in which fluid communication between the fluid pressure chamber and each of the first wheel brake and the second wheel brake is established and fluid communication between the sucking side of the one-way fluid pressure pump and the fluid pressure chamber is prevented, and a second position during traction control in which fluid communication between the sucking side of the one-way fluid pressure pump and the fluid pressure chamber is established and fluid communication between the fluid pressure chamber and each of the first wheel brake and the second wheel brake is prevented;

a first normally opened solenoid valve disposed between the switching valve and the first wheel brake;

a second normally opened solenoid valve disposed between the switching valve and the second wheel brake; and a return circuit establishing fluid communication between the sucking side of the one-way fluid pressure pump and each of the first wheel brake and the second wheel brake for drawing fluid pressure from the first and second wheel brakes, and establishing fluid communication between the discharging side of the one-way fluid pressure pump and both the first normally opened solenoid valve and the second normally opened solenoid valve.

8. A brake control device as set forth in claim 7, including a first regulating device disposed in the return circuit between the sucking side of the first one-way fluid pressure pump and the first wheel brake for decreasing the fluid pressure in the first wheel brake in response to closing of the first solenoid valve and increasing the fluid pressure in the first wheel brake in response to opening of the first solenoid valve.

9. A brake control device as set forth in claim 8, wherein the first regulating device is an orifice.

10. A brake control device as set forth in claim 8, wherein the first regulating means is a normally opened solenoid valve.

11. A brake control device as set forth in claim 8, including a second regulating device disposed in the return circuit between the sucking side of the first one-way fluid pressure pump and the second wheel brake for decreasing the fluid pressure in second wheel brake in response to closing of the second solenoid valve and increasing the fluid pressure in the second wheel brake in response to opening of the second solenoid valve.

12. A brake control device as set forth in claim 11, wherein the second regulating means is a normally opened solenoid valve.

13. A brake control device as set forth in claim 11, wherein the second regulating device is an orifice.

* * * * *